(12) United States Patent
Sunio et al.

(10) Patent No.: US 9,784,579 B2
(45) Date of Patent: Oct. 10, 2017

(54) RUNWAY MEASUREMENT SYSTEM AND METHOD

(75) Inventors: Juha Sunio, Hyvinkää (FI); Jonna Nousiainen, Hyvinkää (FI); Matti Pekkarinen, Helsinki (FI)

(73) Assignee: KONECRANES GLOBAL CORPORATION, Hyvinkää (FI)

(*) Notice: Subject to any disclaimer, the term of this patent is extended or adjusted under 35 U.S.C. 154(b) by 1018 days.

(21) Appl. No.: 13/508,888

(22) PCT Filed: Nov. 10, 2009

(86) PCT No.: PCT/FI2009/050904
§ 371 (c)(1),
(2), (4) Date: May 9, 2012

(87) PCT Pub. No.: WO2011/058212
PCT Pub. Date: May 19, 2011

(65) Prior Publication Data
US 2012/0224056 A1    Sep. 6, 2012

(51) Int. Cl.
*H04N 7/18* (2006.01)
*G01C 15/00* (2006.01)
*B61L 23/04* (2006.01)

(52) U.S. Cl.
CPC .......... *G01C 15/008* (2013.01); *B61L 23/047* (2013.01)

(58) Field of Classification Search
CPC ............. G01C 15/008; B61L 23/047
See application file for complete search history.

(56) References Cited

U.S. PATENT DOCUMENTS 6,415,208 B1 * 7/2002 Pojda .................. B61K 9/08
340/436
2004/0060471 A1    4/2004 Fahrion
(Continued)

FOREIGN PATENT DOCUMENTS

CN        1068660 A1    2/1993
DE        212 931 A1    8/1984
(Continued)

OTHER PUBLICATIONS

Braunecker, et al. WO 2006000552 A1 English Translation.*

*Primary Examiner* — Joseph Ustaris
*Assistant Examiner* — Jill Sechser
(74) *Attorney, Agent, or Firm* — Birch, Stewart, Kolasch & Birch, LLP (57) ABSTRACT

A measuring system comprising a fixed measurement unit (101), a data processing unit (130) and a mobile unit (120). The mobile unit comprises a planar base (111), a reflector (118), an elevation element (119) fixed to the base and the reflector, and attaching the reflector to a fixed position in respect of the base. The mobile unit comprises also mobility means (112) for moving the base along a surface (113) such that the spatial orientation of the base (114) substantially corresponds with the spatial orientation of the currently underlying part of the surface. In addition the mobile unit comprises tilt measuring means (123) for determining a deviation between the spatial orientation of the base and a plane perpendicular to the ambient gravitational force, and tilt elimination means for eliminating the effect of the determined deviation. Measurement results are thus more accurate.

5 Claims, 4 Drawing Sheets

(56) References Cited

U.S. PATENT DOCUMENTS

| | | | | |
|---|---|---|---|---|
| 2005/0111012 | A1* | 5/2005 | Waisanen | 356/622 |
| 2006/0271298 | A1* | 11/2006 | MacIntosh | G01V 3/38 |
| | | | | 702/5 |
| 2007/0171434 | A1* | 7/2007 | Wickhart | 356/622 |

FOREIGN PATENT DOCUMENTS

| | | |
|---|---|---|
| EP | 2 017 574 A2 | 1/2009 |
| GB | 2 257 864 A | 1/1993 |
| GB | 2 437 752 A | 11/2007 |
| JP | 07-208994 A | 8/1995 |
| JP | 2006-234409 A | 9/2006 |
| WO | WO 2007/087317 A2 | 8/2007 |
| WO | WO 2008/124713 A2 | 10/2008 |

* cited by examiner

RUNWAY MEASUREMENT SYSTEM AND METHOD

FIELD OF THE INVENTION

The present invention relates to measuring systems, and more particularly to a measurement system for measuring dimensions of a runway.

BACKGROUND OF THE INVENTION

A runway refers here to a surface on which an object may travel. In the vertical direction, the runway thus comprises a plane that is substantially perpendicular to the ambient gravitational force. Typically the runway also comprises some mechanism that eliminates possible lateral forces to allow progress of the object along the runway.

A well known example of a runway is a rail system that may comprise one, two or more rails, mounted on the ground such that their top surface is substantially perpendicular to the ambient gravitational force. Rail systems are surveyed periodically to ensure the dimensions of the rails are within established geometrical values (standards). Data generated during the survey is then utilized to correct the positioning of the rails if there is any deviation.

Traditionally runway surveys have been performed with manual arrangements that apply theodolites or lasers. Recent years have brought in use a tachymeter that can be fixed to one position while a target moves longitudinally along a rail to predefined measuring positions. By measuring the coordinates and distance of the target, the values needed to compute dimensional characteristics of the rail defined in the runway standards (for example span, rail to rail elevation, elevation and straightness) can be directly determined.

Recently, a number of automated measuring systems have been introduced. Document US 2005/0111012 discloses a laser survey device, which uses a remotely operated laser to perform a runway survey The laser survey device includes a stationary component, that includes a self-leveling laser, and a mobile component, that includes a screen and an image capture device. In operation, the stationary self leveling laser emits a beam of laser light towards the screen of the mobile component as the mobile component travels along the length of a crane rail. As the mobile screen travels along the length of the crane rail, the location of impact of the laser light on the mobile screen changes depending on movement of the mobile screen within a plane perpendicular to the steady beam of laser light emitted by the stationary, self leveling laser. The image capture device captures and transmits to a remote computer information related to location of impact of the laser light on the mobile screen. The remote computer uses the received information to assess alignment of the crane rail.

U.S. Pat. No. 6,415,208, describes a laser-based survey device that is very similar, in both design and operation, but is configured to collect alignment data for top-rail crane rail configuration.

Document WO 2007/087317 describes a method and apparatus for conducting an overhead crane runway system survey by using a survey apparatus that is alternately pushed or pulled by an overhead crane.

Document EP2017574 discloses a arrangement for measuring a rail that comprises a fixed tachymeter and a mobile reflecting surface. The measurement comprises determining the position of the mobile element and transmitting the measurement results over the air interface to a computer for further processing.

The problem with any of these automated solutions is deficient accuracy of the results. Rails may have local structures that disrupt the otherwise substantially linear dimensions of the rail. In time and use the rails also wear and the surface on which the moving target travels begins to comprise deformations. These structures caused by deformations and/or local structures are in the following called jointly as defects, and they may cause the measuring elements to diverge from their initial, planned spatial configuration. This spatial configuration is, however, a basis for computing equations and algorithms used in determining the surveyed result values. When the spatial configuration between the separate elements changes, the results become distorted. The reliability of the measured values is thus uncontrollably dependent on the state of the measured track, which is not acceptable.

BRIEF DESCRIPTION OF THE INVENTION

An object of the present invention is thus to provide a method and an apparatus for implementing the method to improve the accuracy of runway measurements. The objects of the invention are achieved by a mobile unit, a measurement system, a method and a computer program product, which are characterized by what is stated in the independent claims. The preferred embodiments of the invention are disclosed in the dependent claims.

Embodiments of the invention apply a fixed unit and a mobile unit carrying a reflector from which a measurement signal from the fixed unit is directed. Defects in the track mean that a plane carrying the target and a plane perpendicular to the ambient gravitational force are not parallel but deviate from each other. In the invention, these deviations are measured and the effect from the determined deviations is then eliminated. This facilitates more accurate results, and detaches the accuracy of the results from the local structures or state of the measured track. This and the possible further advantages are discussed in more detail with the detailed description of embodiments illustrating the invention.

BRIEF DESCRIPTION OF THE DRAWINGS

In the following the invention will be described in greater detail by means of preferred embodiments with reference to the attached [accompanying] drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different embodiments will be described using an example of system architecture without, however, restricting the invention to the disclosed terms and structures.

Figure 1:
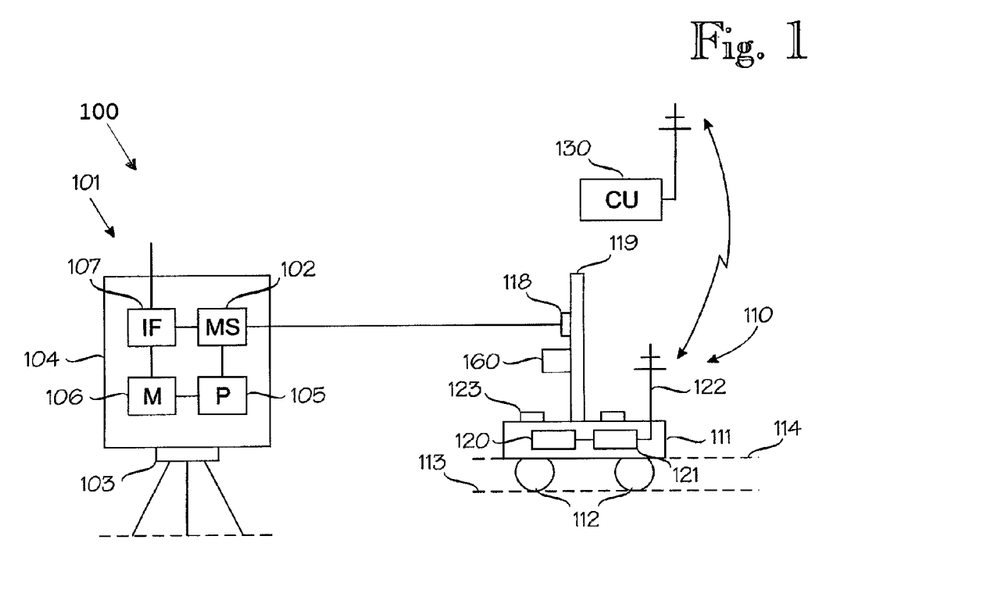
FIG. 1 shows an arrangement that represents an interconnection of entities for creating an embodied measuring system.

FIG. 1 shows an arrangement that represents an interconnection of entities for creating an embodied measuring system 100. FIG. 1 is simplified system architecture chart that shows only elements and functional entities necessary to describe the implementation of the invention in the present embodiment. It is apparent to a person skilled in the art that measuring systems may also comprise other functions and structures not explicitly shown in FIG. 1. The illustrated entities represent logical units and connections that may have various physical implementations, generally known to a person skilled in the art. In general, it should be noted that some of the functions, structures, elements and protocols used for creating a context for the embodiments are, as such, irrelevant to the actual invention. Words and expressions in the following descriptions are intended to illustrate, not to restrict, the invention or the embodiment.

The measuring system 100 comprises a fixed measurement unit 101. Fixed in this context means that the unit remains fixed during a measurement. Between measurements the fixed unit 101 may be moved to another location and fixed there for another measurement sequence.

The fixed measurement unit 101 comprises a measurement signal unit 102 that is configured to generate a rectilinearly progressive signal towards a reflective target, detect the reflected signal when it returns, and on the basis of the timing and/or position information of the outgoing and incoming signals determine values representing the position of the target. The rectilinearly progressive signal may be provided in the form of, for example, a laser or infrared light signal. However, other wavelengths or other types of signals may be applied within the scope of protection.

The fixed measurement unit 101 comprises also a fixing mechanism 103 that allows the fixed measurement unit 101 to be detachably secured to a defined position. In its simplest form the fixing mechanism 103 may apply gravity. For example, some part of a chassis 104 enclosing the measurement signal unit 102 may have a bottom surface that due to the weight of the fixed measurement unit 101 presses against an underlying surface such that it remains immobile throughout the measurement session. Typically the fixing mechanism 103, however, comprises also some kind of adjustment mechanism, for example a tripod, which also allows positioning of the signal source to a desired height and location. Depending on the application, fixed measurement unit 101, for example its adjustment mechanism can be equipped with a clamping arrangement that secures the fixed measurement unit 101 to a defined point in respect of the measured surface. Other known fixing methods may be applied without deviating from the scope of protection.

The fixed measurement unit 101 comprises also a processor unit 105. The processor unit 105 is an element that essentially comprises one or more arithmetic logic units, a number of special registers and control circuits. Connected to the processor unit 105 is a memory unit 106, data medium where computer-readable data or programs. The memory unit 106 may comprise volatile or non-volatile memory, for example EEPROM, ROM, PROM, RAM, DRAM, SRAM, firmware, programmable logic, etc.

The fixed measurement unit 101 also comprises an interface unit 107 with at least one input unit for inputting data to the internal processes of the fixed measurement unit 101 and at least one output unit for outputting data from the internal processes of the fixed measurement unit 101. If a line interface is applied, the interface unit typically comprises plug-in units acting as a gateway for information delivered to its external connection points and/or for information fed to the lines 107 connected to its external connection points. If a radio interface is applied, the interface unit typically comprises a radio transceiver unit, which includes a transmitter and a receiver, and is also electrically connected to a processing unit 105. Depending on the application, the interface unit may also support more than one type of interfaces. The interface unit 107 may also comprise a user interface with a keypad, a touch screen, a microphone, or equals for inputting data and a screen, a touch screen, a loudspeaker, or equals for outputting data.

The processor unit 105, the memory unit 106, and the interface unit 107 are electrically interconnected to perform systematic execution of operations on the received and/or stored data according to the predefined, essentially programmed processes of the fixed measurement unit 101. These operations comprise compiling and forwarding values that represent the determined position of the target to a defined external or integrated unit for computing. As well known to a person skilled in the art, the values may be transmitted as raw measurement data or the fixed unit may be configured to pre-process the values into coordinate values of a defined type and/or complement the values with defined metadata. In general these operations comprise the part of the fixed measurement unit in the measurement processes, described in more detail later on in this description.

In an example, a fixed measurement unit 101 may be implemented by means of a tachymeter. The tachymeter is a known device, which allows making goniometric measurements simultaneously with measurement of distances and on the base of received data to make engineering calculations, keeping all existing information. The opportunity of transfer of the data picking during measurements through the special interface in a computer with the subsequent processing have made tachymeter the one of the most popular measurement devices in various technical fields. However, other measurement solutions applying reflection of a rectilinearly progressing signal from the target may be applied without deviating from the scope of protection.

The measuring system 100 comprises also a mobile unit 110. The mobile unit 110 comprises a planar base 111 and mobility means 112. The mobility means 112 are attached to the planar base 111 and allow the base to move along a surface 113 such that the spatial orientation of the base 114 substantially corresponds with the spatial orientation of the currently contacted part of the surface 113.

Figure 2:
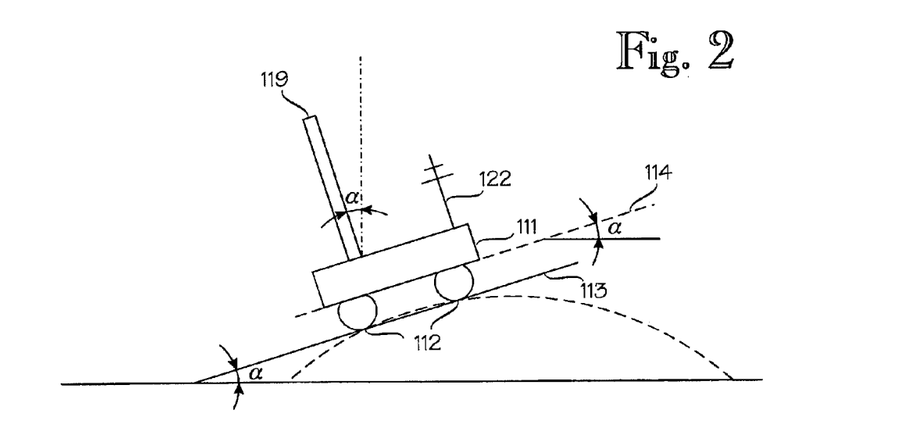
FIG. 2 provides a side view of a mobile unit in a contoured surface.

The concept of spatial orientation is illustrated in more detail in FIGS. 2A and 2B. The base 111 has a substantially rigid form and any changes or movements in its interface with the mobility means 112 are carried to the whole body of the base. The characteristic that the base 111 is planar means that the interface with the mobility means 112 is not a single support point, but comprises two or more contact points, or a contact surface through which the resultant forces from the contact between the surface 113 and the mobility means 112 are conveyed to the body of the base. Accordingly, forces by the impact of the mobility means with the contact surface have an effect to the body of the base 111 via more than one contact point. The spatial orientation of the base 111 is thus a result of movement by all the contact points, or the whole contact surface to the substantially rigid body of the base. For illustrating and measuring the spatial orientation of the base 111, a plane 114 in fixed position in respect of the body, preferably crossing the body of the base 111, is considered to represent the spatial orientation of the base. When the mobile unit 110 moves on a surface, spatial orientation of this plane 114 represents the change of orientation conveyed to any elements 119, 122 attached to the mobile unit 110.

In FIG. 1 the mobile unit 110 is on a horizontal surface. FIG. 2 provides a side view of the mobile unit 110 in a contoured surface. In this example, the mobility means 112 comprise wheels attached to the base 111. When the mobile unit 110 runs, the wheels contact the underlying surface, the spatial orientation of the surface 113 in respect to the horizontal level in this perspective is now α. The wheels mediate the spatial orientation, so the spatial orientation of the base 114 is also α. This is the case in an example where the wheels are equal and there is thus no initial deviation between the contact plane and the base 111. In case some initial deviation exists, the spatial orientation of the base 114 is the sum of this initial deviation and α. In any case, whether initial deviation exists or not, the deviations of the underlying surface 113 from the horizontal level are conveyed directly to the spatial orientation of the base 114. Clearly, any elements 119, 122 attached to the base 111 experience a corresponding deviation or tilt α.

The mobile unit comprises also a reflector 118, and an elevation element 119 fixed to the base 111 and the reflector 118. The reflector 118 is configured to reflect a signal transmitted from the fixed unit 101. Depending on the type of the signal, the reflection may be caused in many ways, known to a person skilled in the art. In the exemplary case of tachymeter the signal is a light wave and the reflector returns the signal via total reflection, caused by means of a prism. The reflector 118 is attached to the elevation element 119, which is further attached to the base 111 of the mobile unit 110. In FIG. 1 the elevation element 119 is attached perpendicularly in respect to the plane 114 illustrating the spatial orientation of the base 111. However, any mutual orientation (i.e. initial deviation) may be applied between the base 111 and the elevation element 119, as long as the elevation element 119 attaches the reflector 118 to a fixed position in respect of the base 111.

The mobile unit is advantageously self-propelled and thus capable of moving without external driving arrangements. This may be implemented by any integrated driving mechanisms 120, as such generally known to a person skilled in the art. The mobile unit may also be self-navigating, i.e. move according to a predefined internal moving scheme. However, advantageously the mobile unit comprises a control element 121 that is connected to the driving mechanism and comprises an interface for an external connection. The control element structure may comprise a processor unit, a memory unit, and an interface unit, which are electrically interconnected to perform systematic execution of operations on the received and/or stored data, as described in the case of the fixed unit. The received data may comprise driving instructions, transmitted from an authorized external source. Since the mobile unit is moving, the external connection is preferably implemented over a radio interface. For radio communication, the mobile unit 110 advantageously comprises a radio transceiver 122 that includes a transmitter and a receiver.

The measuring system 100 comprises also a computing unit 130. The computing unit 130 may be any node or a host which is able to provide an interface or interfaces through which the fixed unit and/or the mobile unit may exchange information with it, and process the received an possibly stored information, as will be discussed below. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a console, a laptop (a notebook), a personal digital assistant, a mobile station (mobile phone), and a line telephone.

In general, various embodiments of a computing unit apparatus may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any apparatus-readable data storage medium and they include program instructions to perform particular tasks. Thus the exemplary embodiments of this invention also provide a computer program product, readable by a computer and encoding instructions for executing a process for surface measurement in a measuring system of FIG. 1.

In an example, the computing unit may be implemented with a personal computer that provides a radio connection to the fixed unit 101 and/or the mobile unit 110. Local or cellular radio technologies may be applied in the radio connection.

Figure 3:
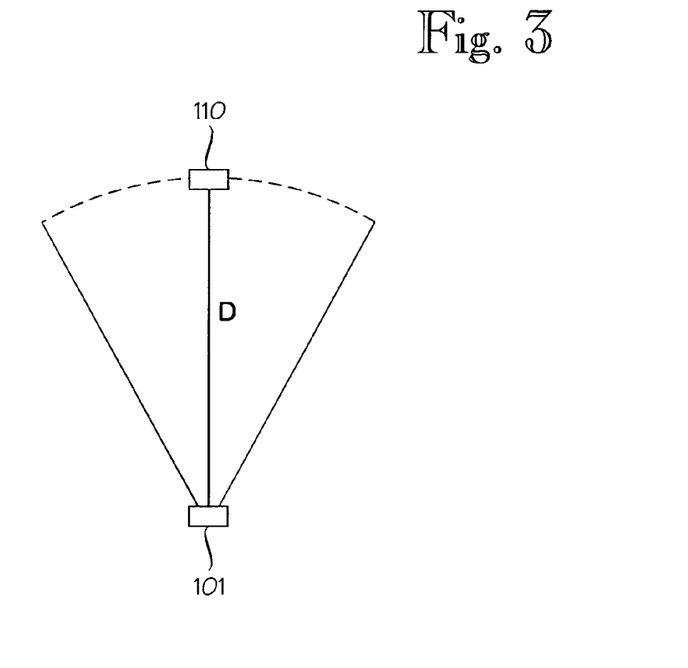
FIG. 3 illustrates a top view of a typical measurement configuration between fixed and mobile unit elements of the measurement system.

FIG. 3 shows a top view of a typical measurement configuration between the fixed unit 101 and mobile unit 110 elements of the measurement system 100. In one measurement, the fixed unit 101 measures and records at least a horizontal coordinate x, a vertical coordinate y (not shown) and distance D of a defined point (in this embodiment the reflector 118) of the mobile unit 110. A defined algorithm is applied to compute any further result values from these measured values.

Figure 4:
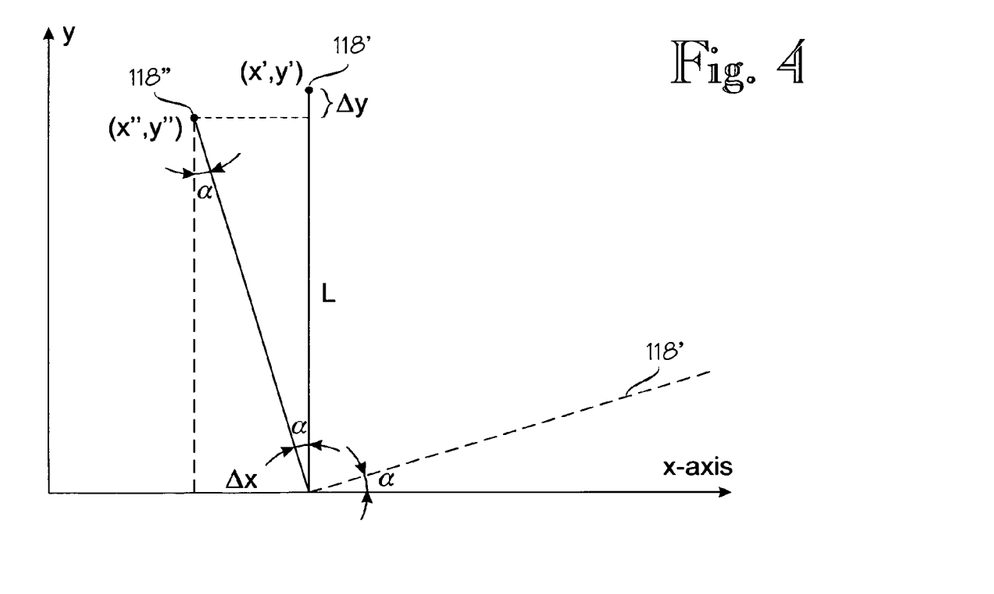
FIG. 4 illustrates in a side view two spatial orientations of a reflector of the mobile unit.

FIG. 4 illustrates in a side view two spatial orientations 118' and 118" of the reflector 118 of the mobile unit. When the mobile unit moves an a substantially horizontal plane, the spatial orientation of the base 114 parallel to the horizontal direction x is zero and the coordinates of the reflector 118' that the elevation element 119 raises to the height L from the base 111 are (x',y'). However, in case the surface is defected and therefore not horizontal, the base 111 tilts such that the spatial orientation of the base 114 is a. Due to this deviation the measured position coordinates (x",y") deviate correspondingly by $\Delta x$ and $\Delta y$ from the original values (x',y'). Generally the applied algorithm is based on an assumption that the base 111 on which the elevation element 119 stands is parallel to the selected horizontal direction x. This means that the deviations $\Delta x$ and $\Delta y$, caused by the measured surface not being parallel with a plane perpendicular to the ambient gravitational force, cause an error to the measurement results computed with the algorithm. In practise, these errors may be detrimental to the reliability of the results, especially the errors $\Delta x$ in the horizontal direction.

Thus, in order to improve the accuracy of the results, the measuring system 100 of the present embodiment comprises also tilt measuring means 123 (FIGS. 1 and 3) for determining a deviation between the base and the plane perpendicular to the ambient gravitational force. Tilt measurement means may be implemented in various ways. In one implementation, the deviation is presented and measured in form of a tilt angle $\alpha$, and the mobile unit 110 may comprise an inclinometer or clinometer, which is an instrument for measuring angles of slope (or tilt), elevation or inclination of an object with respect to gravity. Examples of inclinometers comprise a tilt meter, tilt indicator, slope alert, slope gauge, gradient meter, gradiometer, level gauge, level meter, declinometer, and pitch & roll indicator. In another implementation the mobile unit 110 may be configured to comprise a number of measuring points in different, defined parts of the base 111. By measuring the positions of these measuring points and using the knowledge of their mutual spacing in the base 111, the tilt $\alpha$ of the base 111 in respect of a computational horizontal plane can be easily computed.

The measuring system 100 of the present embodiment comprises further tilt elimination means for eliminating the effect of the determined deviation. Depending on the application, elimination may be implemented during or after the measurement procedure.

Figure 5:
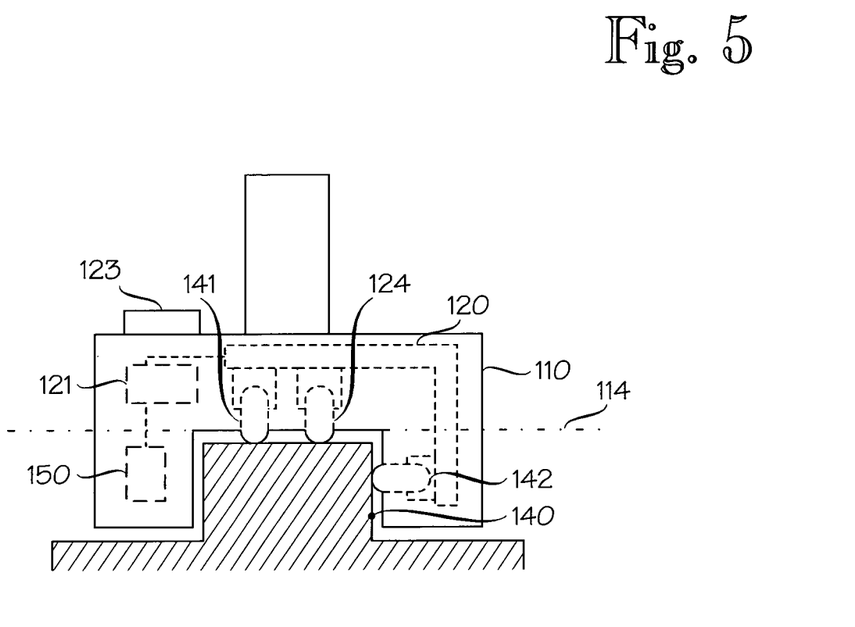
FIG. 5 illustrates an embodiment of the measurement system.

FIG. 5 illustrates an embodiment where the tilt elimination is implemented during the measurement procedure and the tilt elimination means comprise a balancing mechanism integrated to the mobile unit 110. In FIG. 5, the mobility means 112 of the mobile unit 110 are made to provide a rail tracker that allows the mobile unit to move substantially along a track formed by the mid-line of the top surface of the rail. The rail tracker of the embodiment comprises a recess 140, the cross-section of which is dimensioned to encompass the top surface of the rail and at least part of the side surfaces of the rail. The side walls of the recess 140 oppose the lateral forces and provides a side tracker that ensures that the rail is retained within the recess while it moves to a forward direction. The rail tracker comprises also a wheel mechanism 141, which is attached to the base 111 such that at least some wheels protrude from the bottom of the recess to provide a rolling contact to the top surface of the rail.

At least one further wheel, a side wheel 142, may be included to the wheel mechanism 141 to enhance the side tracker by rolling against reference a side of the rail. The reference side of the rail is advantageously the side that is best aligned with the track formed by the mid-line of the top surface of the rail. The wheel mechanism 141 is adjusted such that when the side wheel is against the reference side of the rail, the reflector is substantially vertically aligned with the mid-line of the top surface of the rail. In some cases the reference side of the rail may also be subjected to normal wear. In order to compensate the effect of such wear to the measurement, the side wheel 142 may be made vertically adjustable. This allows the measurement operator to select from the reference surface a track that is in a height which seems least affected by the wear.

It is noted that this rail tracker construction is an example only. Several rail tracking mechanisms, applying different tracking surfaces and rolling or sliding mechanisms can be applied without deviating from the scope of protection.

The tilt measuring means 123 and the control element 121 are interconnected such that the measured values of the tilt measuring means are input to the control element 121. The control element is also interconnected with the driving mechanism 120 that drives the wheels in the wheel mechanism 141. In addition to the conventional rotational control that controls the rotational movement of the wheels, the driving mechanism 120 of the present embodiment comprises also a vertical control mechanism 124 by means of which parallel wheels of the wheel mechanism 141 can be lifted or lowered independent of each other. Accordingly, the mobile unit can be positioned to at least temporally adjust the spatial orientation of the base 114 to eliminate the effect of the determined deviation. This may be implemented, for example, by adjusting the spatial orientation of the base 114 to be substantially parallel with the plane perpendicular to the ambient gravitational force. In the present example, the control element 121 stores a tilt value that defines the threshold for triggering operation of tilt elimination means. When a value received from the tilt measuring means 123 exceeds this tilt value, the control element 121 instructs the driving mechanism 120 to lift one wheel and/or lower the other wheel to compensate the effect of the tilted rail surface.

The measurement system 100 may be configured to take measurements continuously or discretely. In discrete measurements the mobile unit 110 is stopped to the measurement point at least for the time the measurement is taken. In continuous measurements the measurement may be taken while the mobile unit 110 moves. Both measurement types result in a number of discrete measurement values associated to a defined measurement time value, but typically the continuous measurements generate a larger number of results. Depending on the measurement arrangement applied in the system, also the spatial orientation of the base 114 may be adjusted discretely or continuously.

Discrete adjustments may be made at defined points of time and/or at defined locations of the measured path. For discrete measurements, the mobile unit 110 may comprise a measurement timing unit 150 for detecting times when a measurement signal falls to the reflector. Advantageously, the tilt is measured and the effect from the deviation is eliminated before the actual measurement, i.e. before a time when a measurement signal falls to the reflector. In case time based adjustment is applied, the measurement timing unit 150 may be a clock unit that is synchronised with the processor 105 of the fixed unit 101 and recognizes the measurement times when the discrete measurement signals are transmitted from the fixed unit 101. The clock unit may be, for example, controlled by the control element 121 of the mobile unit 121 and preprogrammed with a set of measurement times or intervals. In a defined time just before the measurement time, the control element triggers tilt measuring means 123, in response to which the tilt elimination means 124 may be triggered, depending on the measured tilt value.

In case a location based adjustment is applied, the measurement timing unit 150, or a control unit 121 controlling the operations of the measurement timing unit 150, be configured to, for example, receive from the wheel mechanism 141 an indication of a full rotation of the wheels and increment a counter each time an indication is received. The timer value translates directly into traversed distances and can be used to synchronize the operations of the fixed unit 101 and the mobile unit 110. For example, let the fixed unit be configured with an external mechanism to trigger a measurement signal at defined locations of the measured track. Again, just before such measurement is due, the control element triggers tilt measuring means 123, in response to which the tilt elimination means 124 may be triggered, depending on the measured tilt value.

In continuous measurements the adjustment is advantageously done as fast and as often as possible such that the effect from in the measured surface is effectively eliminated.

Advantageously, the tilt elimination means 124 adjust the spatial orientation of the base in all these cases to be substantially parallel with the plane perpendicular to the ambient gravitational force. It is noted that other mechanisms for timing and synchronizing the units during the measurement may be applied without deviating from the scope of protection.

Figure 6A:
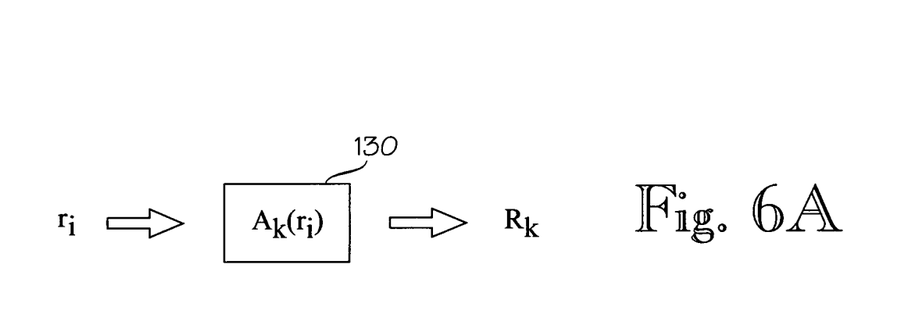
FIGS. 6A and 6B illustrate another embodiment of the measurement system.

FIGS. 6A to 6B illustrate another embodiment, where the tilt elimination is implemented retroactively to the generated measurement results. As illustrated in FIG. 6A, a conventional computing unit 130 interfaces at least the fixed unit, and receives from it, continuously or in a batch run a plurality of measurement records n, associated to a measurement of a defined track. The computing unit 130 comprises at least one algorithm $A_k(r_i)$ that on the basis of the measured values $r_i$, computes a result $R_k$ that represents dimensions of the measured track. Depending on the system design, the computing unit may comprise one or more algorithms $A_k(r_i)$, k=1, . . . , K.

Figure 6B:
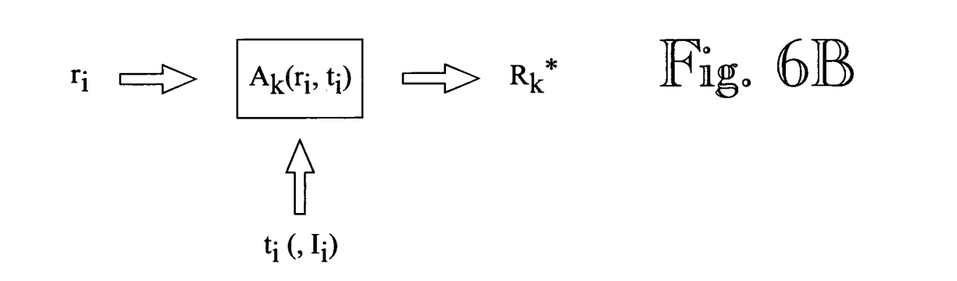

As shown in FIG. 6B, the computing unit of the present embodiment is further configured to receive from the mobile unit 110, continuously or in a batch run, a plurality of measured deviation values $t_i$ representing a measured deviation between the base 111 of the mobile unit 110 and a plane perpendicular to the ambient gravitational force around the mobile unit. Each of the deviation values $t_i$ can be associated to a defined measurement record $r_i$, of a defined track, either implicitly or explicitly. In implicit association, the algorithm pairs the measurement records and deviation values without explicit association information attached to the measured values. For example, in synchronously timed measurements the number of results in both input streams $r_i$, $t_i$ should match such that the computing unit 130 can pair the values according to their input order. In explicit association, input records in either or both of the input streams $r_i$, $t_i$ carry a further pairing or synchronization value (for example, measurement time) by means of which the computing unit 130 can pair the values. As well known to a person skilled in the art, also the deviation values $t_i$ may be transmitted as raw measurement data or the mobile unit may be configured to pre-process the values into coordinate values of a defined type and/or complement the values with further metadata.

The computing unit 130 of FIG. 6B comprises at least one algorithm $A_k(r_i, t_i)$ that on the basis of the measured values $t_i$, computes a tilt corrected result $R_k^*$ that represents dimensions of the measured track, but where the effect of the deviations Δx and Δy caused by defects in the measured surface are eliminated. Computing deviations Δx and Δy and restoring values (x',y') when L and α are known is simple trigonometry, well known to a person skilled in the art. It is evident that $R_k^*$ is much more accurate than $R_k$. Depending on the system design, the computing unit may comprise one or more algorithms $A_k(r_i, t_i)$, k=1, . . . , K.

In a further embodiment, the mobile unit may be further equipped with a camera unit 160 (FIG. 2) that comprises a camera that generates images in at least one view at defined points along the track. Advantageously, the camera unit 160 also comprises an image tracker that is configured to associate an image taken with the camera with tracking information that allows association of the image to a position of the mobile unit 110 where the image was taken. Accordingly, in this embodiment, in addition to the plurality of measured deviation values $t_i$, (FIG. 6B) the mobile unit 110 also sends to the computing unit 130 a plurality of camera records $I_i$ that comprise at least an image and tracking information for that image.

By means of the image tracker the defects can be further mapped to a defined image and the type of the defect may be then verified visually for efficient repair planning. For example, deviations caused by designed structures do not typically require further actions, so repair actions can be focused to other anomalies, like deformations caused by wear and tear.

On the other hand, the images may also be used to verify accuracies of results in some specific cases where the tilt measurement, as such may not react to the defect in the rail. For example, if the rail comprises a short cut, it may be compensated by the horizontal extent of the body of the base, and no tilt is detected or measured. However, parallel visual analysis allows detecting and locating also such points along the track.

Figure 7:
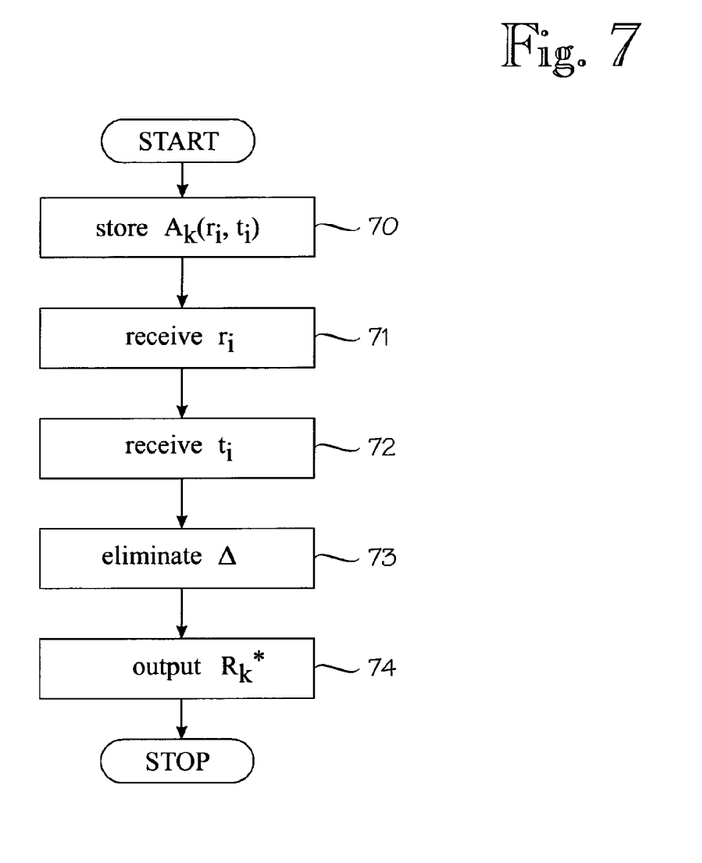
FIG. 7 illustrates an embodiment of a method according to the invention

FIG. 7 illustrates an embodiment of a method according to the invention. In FIG. 7 the method is implemented in a computing unit 130 of the measurement system 100 described in FIGS. 2-6, so description of FIG. 7 may be complemented with any parts of descriptions of those Figures, and vice versa. The procedure begins in a stage where the computing unit 130 is switched on and operative. First the unit is configured (step 70) with at least one algorithm $A_k(r_i, t_i)$. The algorithm inputs measured coordinate values of a mobile unit 110 $r_i$, and based on these coordinate values computes at least one result that represents dimensions of the track the moving object moved along. In addition the algorithm uses the measured deviation values $t_i$, to eliminate the effect of the deviations Δx and Δy caused by defects in the measured surface from the results and thereby provide a tilt corrected result $R_k^*$.

Accordingly, during or after the measurement procedures in the fixed unit 101 and the mobile unit 110s, the unit receives (step 71) measurement records n, associated to a measurement of a defined track. In addition the unit receives (step 72) measured values $t_i$, for a deviation between the base of the mobile unit and a plane perpendicular to the ambient gravitational force around the mobile unit. The unit eliminates (step 73) the effect of the deviations Δx and Δy caused by defects in the measured surface by computing deviations Δx and Δy and restoring values (x',y'), as shown in FIG. 4. Then the unit outputs (step 74) the tilt corrected result $R_k^*$ for, for example, evaluating the status of the measured track.

Due to measuring the deviations between the base supporting the elevation element and a plane perpendicular to the ambient gravitational force, and eliminating the effect of the determined deviation, the output results $R_k^*$ are significantly more accurate than available through conventional means. It is further noted that the measured tilt values may be used, as such, to indicate the inclination of the rails. Also, as previously described, the measured deviation value stream $t_i$, may be complemented with the stream of camera records $I_i$ to facilitate efficient repair planning.

Figure 8:
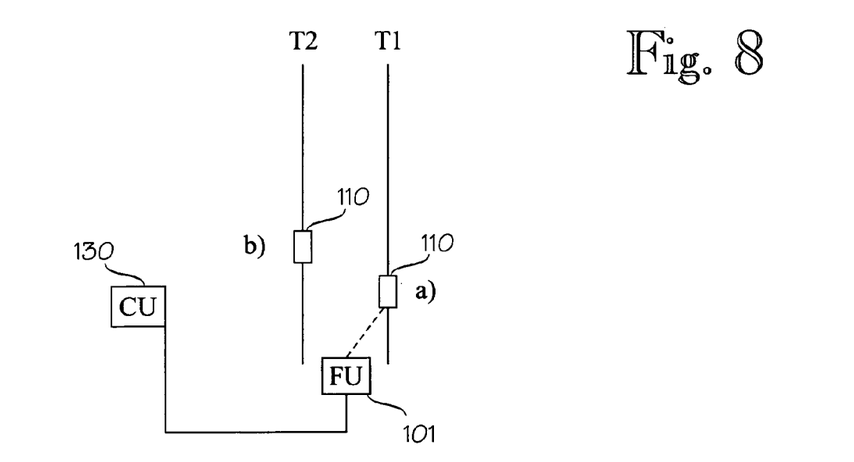
FIG. 8 illustrates one measurement arrangement implemented by means of the invented measurement system.

FIG. 8 illustrates one important measurement arrangement implemented by means of the invented measurement system. The measured tracks comprise two parallel rails T1, T2 that form a driveway for a trolley moving heavy objects. Initially, the rails T1, T2 are mounted such that the top surfaces of the rails are parallel to a plane perpendicular to the ambient gravitational force. At use, the surfaces of the rails wear. Industry standards aim to ensure security and operability of the driveways and therefore provide strict requirements to the dimensions of the rails, individually and also to their mutual positioning. Due to the invented solution, the mobile unit 110 can move along each of the rails T1, T2 separately, the fixed unit 101 can remain in one fixed position, and results for both individual dimensions and mutual positions of the rails can be quickly received. The effects of the tilting of the mobile unit that moves along the rails are eliminated so the accuracy of the results in not dependent on the condition of the rails, so any wear possibly existing on the rail does not deteriorate the measurements or the evaluation of the situation.

The exemplary embodiments of this invention also provide a computer program product, readable by a computer and encoding a computer program of instructions for executing a computer process for controlling functions in the measuring system of FIG. 2.

While various aspects of the invention may be illustrated and described as block diagrams, message flow diagrams, flow charts and logic flow diagrams, or using some other pictorial representation, it is well understood that the illustrated units, blocks, apparatus, system elements, procedures and methods may be implemented in, for example, hardware, software, firmware, special purpose circuits or logic, a computing device or some combination thereof. It will be obvious to a person skilled in the art that, as the technology advances, the inventive concept can be implemented in various ways. The invention and its embodiments are not limited to the examples described above but may vary within the scope of the claims.

The invention claimed is:

1. A measurement system comprising:
a fixed measurement unit configured to remain stationary during measurement of two rails which collectively form a runway;
a mobile measurement unit; and
a computing unit;
the mobile measurement unit comprising:
    a base and a reflector;
    an elevation element fixed to the base and the reflector, and attaching the reflector to a known position in respect of the base;
    wherein the base has a reference plane in a known position with respect to the base such that the tilt of the base in respect of a computational horizontal plane can be determined based on the tilt of the reference plane;
    mobility means configured to separately move the base along a surface defined by each of the two rails, such that the spatial orientation of the reference plane of the base corresponds with the spatial orientation of a currently underlying part of the surface;
    the mobility means comprising a rail tracker for moving the mobile unit substantially along a track formed by the mid-line of the top surface of one of the rails;
    tilt measuring means for determining a tilt of the mobile measurement unit as a deviation between the reference plane of the base and a plane perpendicular to the ambient gravitational force;
    a transmitter which transmits the determined tilt to the computing unit;
the fixed measurement unit comprising:
    a tachymeter which generates a rectilinearly progressive signal to the reflector mounted on the mobile measurement unit and determines a position of the reflector with respect to the fixed measurement unit for each of the two rails based on the generated rectilinearly progressive signal and the reflection, wherein a position of the tachymeter remains the same for measurements of the two rails;
    an interface which transmits the determined positions of the reflector successively for the two rails to the computing unit;
the computing unit comprising:
    a receiver which receives the determined tilt from the mobile measurement unit and the determined positions of the reflector from the fixed measurement unit, successively for the two rails;
    a processor which computes a tilt-corrected result representing dimensions of the measured surface, on the basis of the determined positions of the reflector and the determined tilt of the mobile measurement unit,
    wherein the tilt of the mobile measurement unit is measured in form of a tilt angle between the reference plane of the base and the plane perpendicular to the ambient gravitational force, and the reflector is fixed with respect to the base such that a deviation between the reflector and the ambient gravitational force corresponds to the deviation between the spatial orientation of the base and a plane perpendicular to the ambient gravitational force, and
    wherein the processor, after receiving the tilt and determined positions of the reflector successively for the two rails, further computes dimensions of the runway, based on differences between the tilt-corrected results representing dimensions of the measured surfaces of the respective rails.

2. The measurement system according to claim 1, wherein the mobile unit further comprises a camera and the measurement system comprises an image tracker configured to associate an image taken with the camera to the position of the mobile unit where the image was taken.

3. The measurement system according to claim 1, wherein the mobility means comprises at least two parallel wheels, and the mobile measurement unit further comprises a vertical control mechanism configured to lift or lower the at least two parallel wheels, independently of each other, to correct the tilt of the mobile measurement unit based on the tilt-corrected result.

4. A method comprising:
performing a measurement cycle for each of two rails which collectively form a runway, each measurement cycle comprising the following steps:
    at a fixed measurement unit, the fixed measurement unit being fixed during both measurement cycles:
        generating a rectilinearly progressive signal by a tachymeter, detecting a reflection of the rectilinearly progressive signal from a reflector mounted on a mobile measurement unit, and determining a position of the reflector based on the generated rectilinearly progressive signal and the reflection;
        transmitting the determined position of the reflector to a computing unit;
    at the mobile measurement unit, which has a base and the reflector, the base having a reference plane in a fixed position with respect to the body such that the tilt of the base in respect of a computational horizontal plane can be determined based on the tilt of the reference plane, the reflector being attached to a known position in respect of the base:
        moving the base along a surface defined by one of the two rails such that the spatial orientation of the reference plane of the base substantially corresponds with the spatial orientation of a currently underlying part of the surface;

determining a tilt of the mobile measurement unit as a deviation between the reference plane of the base and a plane perpendicular to the ambient gravitational force;

transmitting the determined tilt to the computing unit; and at the computing unit:

receiving the determined tilt from the mobile measurement unit, and receiving the determined position of the reflector from the fixed measurement unit; and computing a tilt-corrected result representing dimensions of the measured surface, on the basis of the determined position of the reflector and the determined tilt of the mobile measurement unit; and after completing the above steps using the same fixed measurement unit, mobile measurement unit and computing unit for both measurement cycles, computing dimensions of the runway, based on differences between the tilt-corrected results representing dimensions of the measured surfaces of the respective rails, wherein the tilt of the mobile measurement unit is measured in form of a tilt angle between the reference plane of the base and the plane perpendicular to the ambient gravitational force, and the reflector is fixed with respect to the base such that a deviation between the reflector and the ambient gravitational force corresponds to the deviation between the spatial orientation of the base and a plane perpendicular to the ambient gravitational force.

5. The method according to claim 4, wherein the mobility means comprises at least two parallel wheels, and the mobile measurement unit further comprises a vertical control mechanism configured to lift or lower the at least two parallel wheels, independently of each other, to correct the tilt of the mobile measurement unit based on the tilt-corrected result.

* * * * *